(12) United States Patent
Ota et al.

(10) Patent No.: US 11,377,152 B2
(45) Date of Patent: Jul. 5, 2022

(54) VEHICLE REAR PORTION STRUCTURE

(71) Applicant: Toyota Jidosha Kabushiki Kaisha, Toyota (JP)

(72) Inventors: Kosei Ota, Okazaki (JP); Masanori Yoshimoto, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 479 days.

(21) Appl. No.: 16/451,473

(22) Filed: Jun. 25, 2019

(65) Prior Publication Data
US 2020/0001928 A1 Jan. 2, 2020

(30) Foreign Application Priority Data

Jun. 27, 2018 (JP) ............................. JP2018-122345

(51) Int. Cl.
| B62D 21/15 | (2006.01) |
| B60G 9/04 | (2006.01) |
| B62D 25/08 | (2006.01) |
| B60G 7/02 | (2006.01) |
| B62D 21/11 | (2006.01) |
| B60K 1/04 | (2019.01) |
| B60G 7/00 | (2006.01) |

(52) U.S. Cl.
CPC ............. *B62D 21/152* (2013.01); *B60G 9/04* (2013.01); *B60G 7/008* (2013.01); *B60G 7/02* (2013.01); *B60G 2204/143* (2013.01); *B60G 2204/148* (2013.01); *B60G 2300/50* (2013.01); *B60K 1/04* (2013.01); *B60K 2001/0438* (2013.01); *B62D 21/11* (2013.01); *B62D 25/08* (2013.01)

(58) Field of Classification Search
CPC ...... B62D 21/152; B62D 25/08; B62D 21/11; B60G 9/04; B60G 7/008; B60G 2204/143; B60G 2204/148; B60G 2300/50; B60G 7/02; B60K 2001/0438; B60K 1/04
USPC ..................................................... 296/187.11
See application file for complete search history.

(56) References Cited

U.S. PATENT DOCUMENTS

| 7,237,829 | B2 * | 7/2007 | Latimer, III | ........... | B62D 25/08 280/788 |
| 2018/0148095 | A1 * | 5/2018 | Lipa | ........................ | B60G 7/02 |
| 2019/0375459 | A1 | 12/2019 | Yoshimoto et al. | | |

FOREIGN PATENT DOCUMENTS

| CN | 110576908 A | 12/2019 |
| JP | S6049075 U | 4/1985 |
| JP | 3-59224 U | 6/1991 |
| JP | 8-175421 A | 7/1996 |
| JP | 2009-067075 A | 4/2009 |

* cited by examiner

*Primary Examiner* — D Glenn Dayoan
*Assistant Examiner* — Dana D Ivey
(74) *Attorney, Agent, or Firm* — Dinsmore & Shohl LLP

(57) ABSTRACT

A ridgeline of a bottom surface portion at a rear portion of a rear side member rear at a rear of a fastening portion of rear side members to a rear portion of a rear suspension member is a slope shape which inclines downward toward a vehicle rear. A side member reinforcement, which is a reinforcing member which is against a load in a vehicle length direction, is attached to the rear portion of the rear side member rear. A fragile portion of low rigidity compared to a lower portion is formed at an upper portion of the side member reinforcement.

4 Claims, 15 Drawing Sheets

VEHICLE REAR PORTION STRUCTURE

CROSS REFERENCE TO RELATED APPLICATION

This application claims priority to Japanese Patent Application No. 2018-122345, filed on Jun. 27, 2018, which is incorporated herein by reference in its entirety including the specification, claims, drawings, and abstract.

TECHNICAL FIELD

The present disclosure relates to a vehicle rear portion structure.

BACKGROUND

Rear side members, which are frame members, are provided at a vehicle rear 15 portion. As illustrated in FIG. 12, a pair of rear side members 200 are provided on both sides in a vehicle width direction, and extend in a vehicle length direction. Rear ends of the rear side members 200 are connected to a bumper reinforcement 206 which is a reinforcing member at a vehicle rear end, with a lower back panel 202 and a bumper arm 204 interposed therebetween.

A rear suspension member 208 is hung from and supported by the rear side members 200. The rear suspension member 208 is a support member which supports a suspension mechanism of rear wheels. For example, the rear suspension member 208 includes a plurality of arms, which constitute fastening means for the rear side members 200. More specifically, the rear suspension member 208 includes a pair of front arms 210A and 25 fastening portions 200A which are provided relatively to the front and at both ends in the vehicle width direction, and a pair of rear arms 210B and fastening portions 200B which are provided relatively to the rear and at both ends in the vehicle width direction.

In this regard, when an obstacle collides against a vehicle rear face, i.e., when rear end collision occurs, a shock load transmits to the bumper reinforcement 206 which is the reinforcing member of the vehicle rear end and the rear side members 200, which are frame members connected to the bumper reinforcement 206. When the shock load is inputted to the rear of the rear side members 200, the rear suspension member 208 hung from the rear side members 200 is pushed forward. During this forward movement, the rear suspension member 208 and a member placed ahead of the rear suspension member 208 collide against each other. For example, in view of FIG. 12, the rear suspension member 208, and a battery fastening portion 216, which fastens a battery module 212 to a floor cross 214, collide against each other.

To prevent this collision, it has been considered to make a front end portion 208A of the rear suspension member 208 draw, i.e., take a so-called forward bending posture during rear end collision as illustrated in, for example, FIG. 13. When taking the forward bending posture, the front end portion 208A of the rear suspension member 208 is located below the battery fastening portion 216, and the front end 208A and the battery fastening portion 216 pass each other in the vehicle length direction, so that it is possible to avoid collision.

To make the rear suspension member 208 take the forward bending posture during rear end collision, as illustrated in, for example, FIG. 13, it is considered to buckle and deform the rear side members 200 upward (so-called protruding bend) such that a rear portion of the fastening portion 2008 for the rear arms 210B becomes uppermost.

By making the rear side members 200 protrude and bend as illustrated in FIG. 13, it is possible to lift the rear of the rear suspension member 208. Consequently, for example, the rear suspension member 208 is turned about the front arms 210A counterclockwise as illustrated in FIG. 13, and the front end portion 208A is pulled downward.

To enable this protruding bend, as illustrated in, for example, FIG. 12, a rear side member rear portion 200C has a slope shape such that a ridgeline 200C1 of a bottom surface portion of the rear side member rear portion 200C inclines downward toward the rear, and a shape which is readily buckled and deformed (bent and deformed) in a forward diagonal upper direction during rear end collision.

In this regard, when the rear side member rear portion 200C is crushed and collapsed along an extension direction by a compression load instead of being protruded and bent during the rear end collision as illustrated in FIG. 14, it is difficult to sufficiently lift the rear of the rear suspension member 208. Hence, according to, for example, JP 2009-67075 A, as illustrated in, for example, FIG. 15, a reinforcing member 218 (a rear side member on a rear side) is provided to the rear side member rear portion 200C. By providing the reinforcing member 218, it is possible to prevent the rear side member rear portion 200C from being crushed and deformed along the extension direction as illustrated in FIG. 14.

SUMMARY

By providing the reinforcing member to the rear side member rear portion, it is possible to sufficiently secure a lifting height of the rear suspension member rear portion resulting from the protruding bend. However, when the suspension member rear portion is lifted and the rear suspension member takes the forward bending posture, and then the rear side member rear portion keeps the shape without being buckled and deformed (for example, crushed and deformed), collision energy is not absorbed at this portion. It is therefore an object of the present disclosure to provide a vehicle rear portion structure which can absorb collision energy more than a conventional technique, while securing the lifting height of a rear suspension member rear portion during rear end collision.

The present disclosure relates to a vehicle rear portion structure. The vehicle rear portion structure includes rear side members and a rear suspension member. The rear side members are provided on both sides in a vehicle width direction at a vehicle rear, and extend in a vehicle length direction. The rear suspension member is hung and supported by the rear side members. A ridgeline of a bottom surface portion at a rear portion of the rear side members at a rear of a fastening portion of the rear side members to a rear portion of the rear suspension member has a slope shape which inclines downward toward a rear of a vehicle. A reinforcing member which is against a load in the vehicle length direction is attached to the rear portion of the rear side members. A fragile portion which is formed at an upper portion of the reinforcing member and has a low rigidity compared to a lower portion of the reinforcing member.

According to the above disclosure, the rear portion of the rear side members is reinforced against the load in the vehicle length direction by the reinforcing member. Consequently, crush and deformation in the vehicle length direction of the rear portion of the rear side members is prevented at an initial stage of rear end collision, and a non-reinforced portion at a front of the rear portion of the rear side members starts being buckled. The rear portion of the rear side members is prevented from being buckled at the initial stage of the rear end collision, so that a lifting height of the rear portion of the rear suspension member is secured. In addition, the relatively fragile portion is provided at the upper portion of the reinforcing portion. Consequently, when the rear end collision progresses and the non-reinforced portion is buckled, the reinforcing member and the rear portion of the rear side members can be buckled from the fragile portion, so that collision energy is absorbed by the buckling.

Furthermore, according to the above disclosure, the lower portion of the reinforcing member may include a ridgeline along the ridgeline of the bottom surface portion at the rear portion of the rear side members. Furthermore, the upper portion of the reinforcing member may include a ridgeline of an approximately L shape as the fragile portion which includes a first ridgeline which is extended relatively in the vehicle length direction in a side view, and a second ridgeline which is extended relatively in a vehicle height direction.

During rear end collision, the rear portion of the rear side members is buckled and deformed in a forward diagonal upper direction along the slope shape of the ridgeline of the bottom surface portion at the rear portion of the rear side members. In this case, the ridgeline of the approximately L shape formed at the upper portion of the reinforcing member is displaced from the L shape to a V shape in the side view in response to the buckling and the deformation of the rear portion of the rear side members in the forward diagonal upper direction, and is readily buckled and deformed such that a valley width of the V shape against a collision load in the vehicle length direction readily narrows. Thus, the upper portion of the reinforcing member includes the ridgeline along an input direction of the collision load at the initial stage of the rear end collision, so that the reinforcing member and the rear portion of the rear side members is prevented from being crushed and deformed. In addition, when the rear end collision progresses and the rear portion of the rear side members is deformed, a load bearing property of the collision load of the ridgeline lowers, and the ridgeline is readily buckled and deformed.

Furthermore, according to the above disclosure, the fastening portion of the rear side members to the rear portion of the rear suspension member, and a front end of the reinforcing member, may be apart.

The mar portion of the rear suspension and the front end of the reinforcing member are provided apart to form the non-reinforced portion, so that it is possible to form the non-reinforced portion as a deformation start point, which is a top of a protruding bend.

According to the present disclosure, it is possible to absorb collision energy more than a conventional technique while securing the lifting height of a rear portion of a rear suspension member during rear end collision.

BRIEF DESCRIPTION OF DRAWINGS

Embodiment(s) of the present disclosure will be described based on the following figures, wherein.

DESCRIPTION OF EMBODIMENTS

A vehicle rear portion structure according to the present embodiment will be described with reference to FIGS. 1 to 11. In addition, in FIGS. 1 to 11, a vehicle front and rear direction (described as a vehicle length direction below, as appropriate) is indicated by an axis which is represented by a reference symbol FR, a vehicle width direction (described as a vehicle width direction below, as appropriate) is indicated by an axis which is represented by a reference symbol LW, and a vertical direction (referred to as a vehicle height direction below, as appropriate) is indicated by an axis which is represented by a reference symbol UP. The reference symbol FR is an abbreviation of Front, and a vehicle length direction axis FR has a vehicle front as a positive direction. The reference symbol LW is an abbreviation of Left Width, and a vehicle width direction axis LW has a vehicle left direction as the positive direction. Furthermore, the vehicle height direction axis UP has an upper direction as the positive direction.

A vehicle rear portion structure according to the present embodiment may be a so-called hybrid vehicle which drives rear wheels with a rotating electric machine 60 and drives front wheels with an internal combustion engine. The front wheels may be driven by cooperation of the internal combustion engine and the rotating electric machine.

Figure 1:
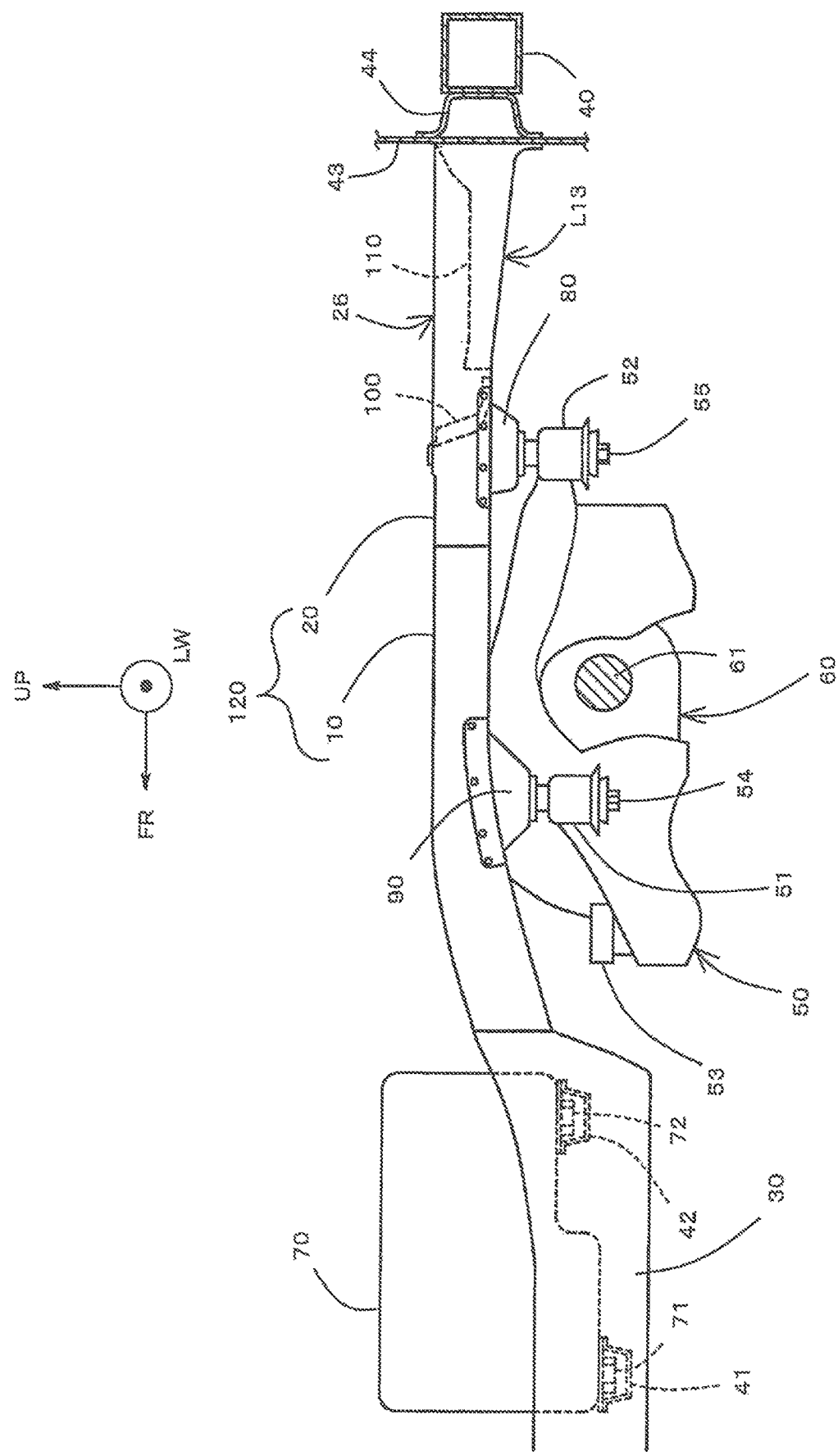
FIG. 1 is a side view illustrating a vehicle rear portion structure according to the present embodiment.

FIG. 1 illustrates a side view of the vehicle rear portion structure according to the present embodiment. FIG. 1 illustrates only the vehicle rear portion structure on a vehicle left side, and the vehicle structure has symmetry, and therefore the vehicle rear portion structure on a vehicle right side also includes the same structure as that in FIG. 1.

The vehicle rear portion structure according to the present embodiment includes rear side members 120 (a rear side member front 10 and a rear side member rear 20), a bumper reinforcement 40, and a rear suspension member 50.

The rear side members 120 are frame members which are provided on both sides in a vehicle width direction at a vehicle rear, and extend in a vehicle length direction. For example, the rear side member 120 is formed by a high tensile steel plate or a hot stamped steel plate. Furthermore, for example, the rear side member 120 includes the rear side member front 10 which is provided relatively at a vehicle length direction front, and a rear side member rear 20 which is provided relatively at a vehicle length direction rear.

A front end of the rear side member front 10 is coupled by welding to rockers 30 which are frame members provided on both ends in the vehicle width direction and extending in the vehicle length direction. Furthermore, the front end of the rear side member front 10 is coupled to the rockers 30 and, in addition, a front member (not illustrated) which is a frame member provided on a vehicle width direction inner side of the rockers 30 and extending in the vehicle length direction in parallel to the rockers 30.

Furthermore, a front of the rear side member front 10 is a vehicle compartment space (cabin). The rockers 30 and the unillustrated front member are provided with floor cross members 41 and 42 which are frame members of a vehicle compartment extended in the vehicle width direction.

A battery module 70 is provided on the floor cross members 41 and 42, and below, for example, a rear passenger seat. The battery module 70 supplies power to the rotating electric machine 60 for rear wheel driving. A lower end of the battery module 70 is fastened and fixed to the floor cross members 41 and 42. More specifically, the front floor cross member 41 and the battery module 70 are fastened by a bolt 71. Furthermore, the rear floor cross member 42 and the battery module 70 are fastened by a bolt 72.

A front end of the rear side member rear 20 is coupled to the rear side member front 10, and a rear end is coupled to the bumper reinforcement 40 which is the reinforcing member at the vehicle rear end. More specifically, the rear end of the rear side member rear 20 is coupled to the bumper reinforcement 40 with a lower back panel 43 which is a panel member at the vehicle rear and a bumper arm 44 which is provided at a rear of the lower back panel 43 interposed therebetween.

Hence, during rear end collision, a shock load transmits along a route of bumper reinforcement 40→(the bumper arm 44→the lower back panel 43→) the rear side member rear 20→the rear side member front 10→the rockers 30. The rear side member rear 20 will be described in detail later. However, by providing a side member reinforcement 110 at a rear portion 26 of the rear side member rear 20 (rear side member rear rearmost portion), the rear side member rear rearmost portion 26 is prevented from being crushed and deformed in the vehicle length direction at an initial stage of the rear end collision.

The rear suspension member 50 is hung from and supported by the rear side members 120 (the rear side member front 10 and the rear side member rear 20). The rear suspension member 50 is a support member which supports an unillustrated suspension mechanism.

The rear suspension member 50 includes four arms which extend in the vehicle width direction and the vehicle length direction. More specifically, the rear suspension member 50 includes a pair of front arms 51 which are provided relatively at the front and at both ends in the vehicle width direction, and a pair of rear arms 52 which are provided relatively at a rear and at both ends in the vehicle width direction. In addition, although the side view in FIG. 1 illustrates only the vehicle left side, the vehicle right side includes the same structure as that in FIG. 1.

A body mount bracket front 90 is provided to the rear side member front 10 to meet the front arms 51 of the rear suspension member 50. Similarly, a body mount bracket rear 80 is provided to the rear side member rear 20 to meet the rear arms 52 of the rear suspension member 50. In other words, the body mount bracket front 90 is a fastening portion of the rear side member 120 to a front portion of the rear suspension member 50. Furthermore, the body mount bracket rear 80 is a fastening portion of the rear side members 120 to a rear portion of the rear suspension member 50.

Figure 3:
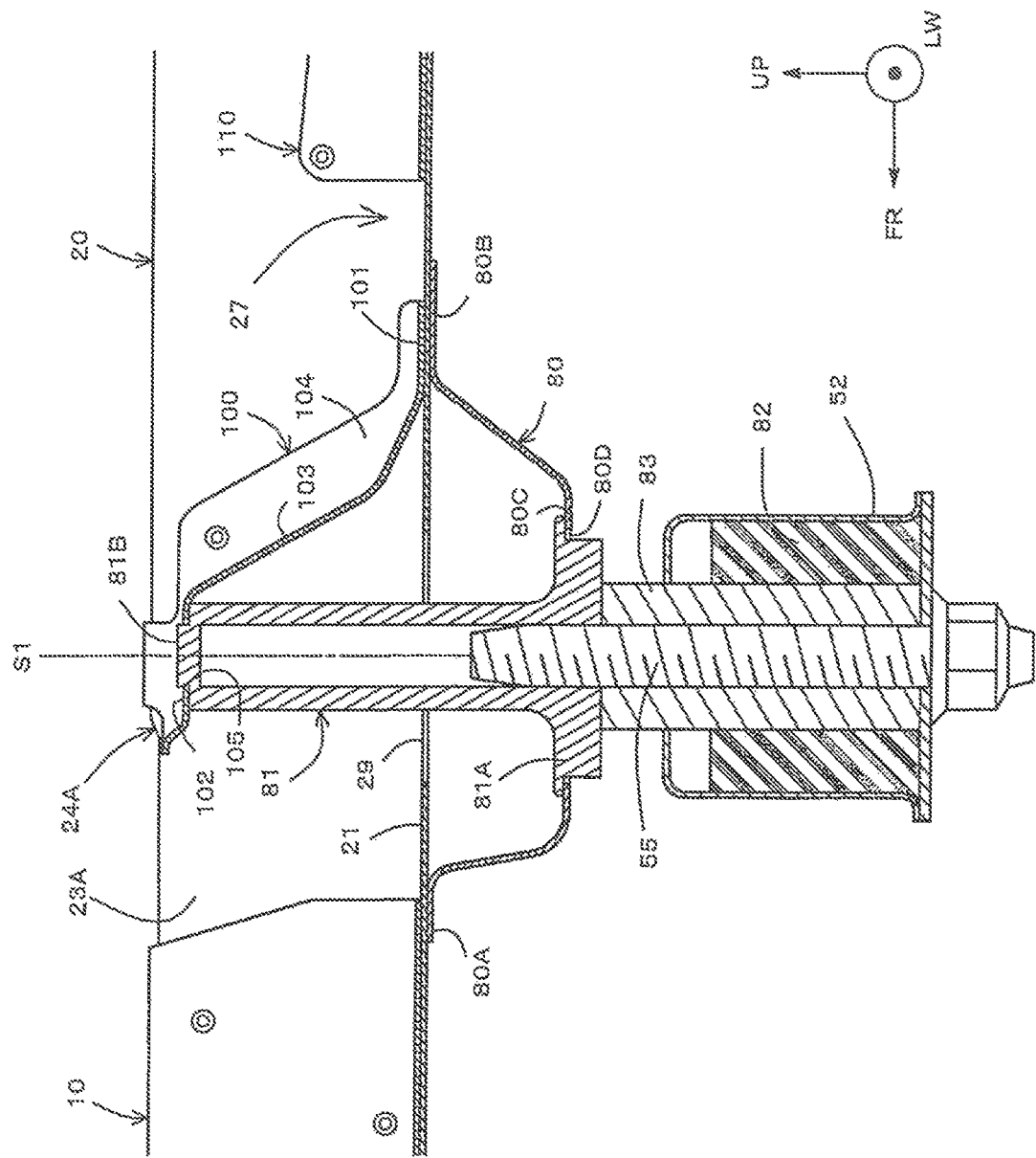
FIG. 3 is an A-A cross-sectional view in FIG. 2.

In the view of FIG. 3, the rear arm 52 is provided with an opening which penetrates in the vehicle height direction, and a suspension member bolt 55 which is a fastening member is inserted in a vehicle height direction upper side of the opening. The rear arm 52 includes a collar 83 which adopts a hollow structure, and in which the suspension member bolt 55 is inserted. Furthermore, a bush 82 of a cylindrical shape which is a buffer member is provided on an outer circumference of the collar 83. The bush 82 is made of a resin material such as rubber.

An upper end portion of the suspension member bolt 55 penetrates the collar 83 and the rear arm 52, protrudes upward, and is screwed into a tube nut 81 fixed to the body mount bracket rear 80. The body mount bracket rear 80 is coupled to the rear side member rear 20 by welding.

In this regard, although FIG. 3 illustrates a fastening structure around the rear arm 52, the front arm 51 also basically adopts the same structure. That is, in the view of FIG. 1, a suspension member bolt 54 is inserted from a lower side to an upper side of the front arm 51. An upper end portion of the suspension member bolt 54 is screwed into a tube nut (not illustrated) fixed to the body mount bracket front 90. The body mount bracket front 90 is coupled to the rear side member front 10 by welding.

Thus, the front arm 51 and the body mount bracket front 90 are fastened and fixed by the suspension member bolt 54 at the front of the rear suspension member 50. Furthermore, the rear arm 52 and the body mount bracket rear 80 are fastened and fixed by the suspension member bolt 55 at the rear of the rear suspension member 50.

A rear wheel suspension mechanism and, in addition, the rotating electric machine 60 for rear wheel driving are mounted on the rear suspension member 50 according to the present embodiment. For example, a rear wheel shaft 61 is provided as an output shaft to the rotating electric machine 60. The rotating electric machine 60 is fastened and fixed to the rear suspension member 50 by a front motor support 53 and a rear motor support (not illustrated) of the rear suspension member 50.

Thus, the rear wheel suspension mechanism and, in addition, the rotating electric machine 60 for rear wheel driving are mounted on the rear suspension member 50 according to the present embodiment. To secure a mounting space for the rotating electric machine 60 and provide durability for the weight of the rotating electric machine 60, the rear suspension member 50 is made large compared to a normal rear suspension member on which the rotating electric machine 60 is not mounted.

Hence, a separation distance between a front end portion (e.g., motor support 53) of the rear suspension member 50 and a rear fastening portion (i.e., the bolt 72 and the floor cross member 42) of the battery module 70 at the front of the front end portion, which have substantially the same height in the vehicle height direction, is reduced compared to the same separation distance of a conventional rear suspension member (on which the rotating electric machine 60 is not mounted). According to this layout in particular, it is more necessary for the rear suspension member 50 than for the conventional rear suspension member to turn bending forward during the rear end collision.

Figure 2:
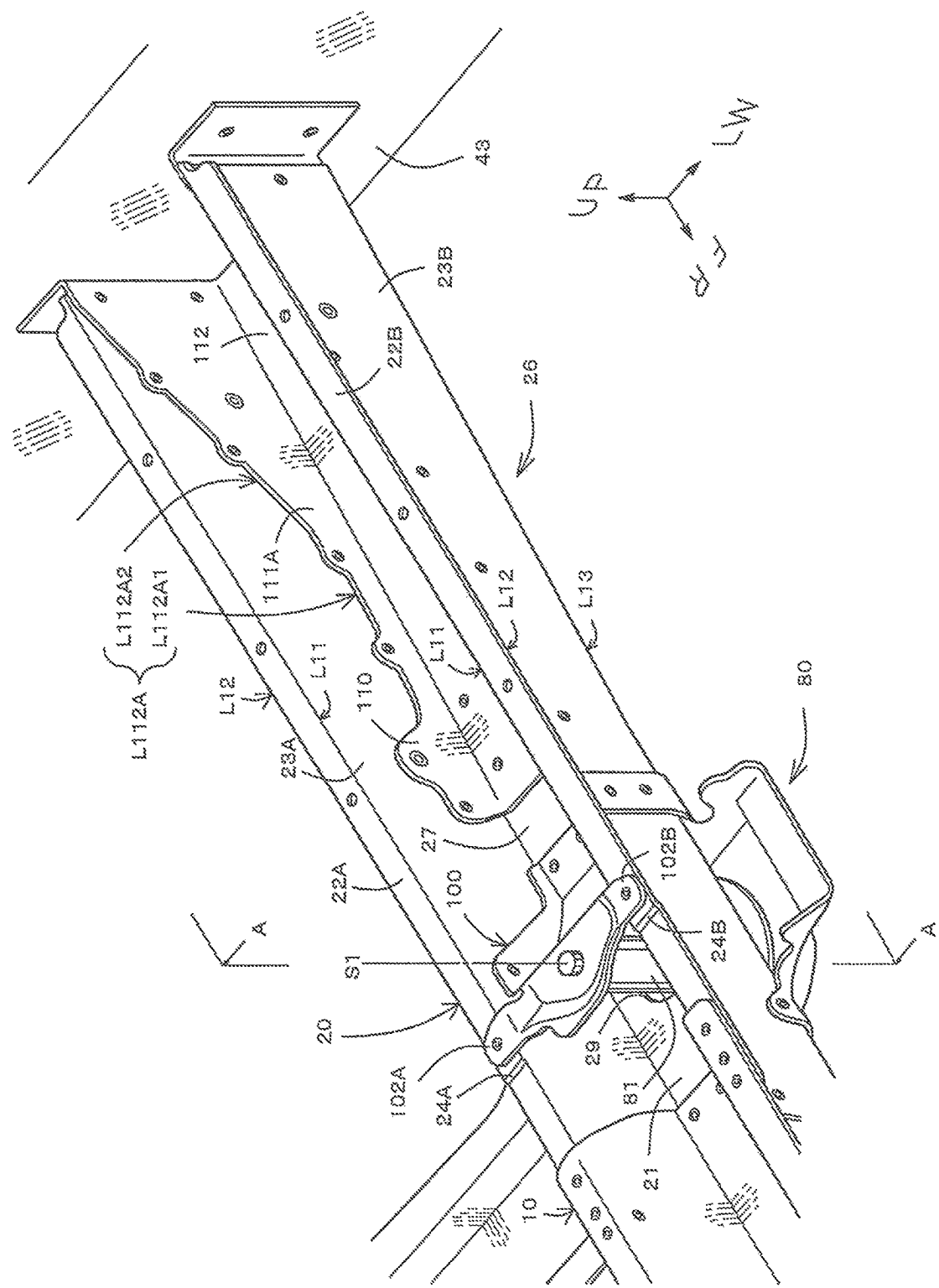
FIG. 2 is a perspective view illustrating a rear side member rear and a surrounding structure of the rear side member rear.

FIG. 2 illustrates the rear side member rear 20 and a surrounding structure of the rear side member rear 20. The rear side member rear 20 is provided with the body mount bracket rear 80 which is the rear fastening portion fastened to the rear portion of the rear suspension member 50.

Furthermore, inside the rear side member rear 20, a nut bearing bracket 100, and the side member reinforcement 110, which is the reinforcing member, are provided. As described below, the side member reinforcement 110 is provided on the rear side member rear rearmost portion 26, and prevents the rear side member rear rearmost portion 26 from being crushed and deformed along the vehicle length direction at the initial stage of the rear end collision.

The rear side member rear 20 is formed in a hat-shaped cross-sectional shape whose upper side is opened. More specifically, the rear side member rear 20 includes a bottom plate 21, a pair of upper plates 22A and 22B, and a pair of side plates 23A and 23B which connect the bottom plate 21 and a pair of upper plates 22A and 22B. Furthermore, a panel member such as an unillustrated floor panel is bonded by welding to a pair of upper plates 22A and 22B, so that the rear side member rear 20 is formed in a closed cross-sectional shape.

Furthermore, as illustrated in FIG. 1, the rear side member rear rearmost portion 26 indicates a rear portion of the rear side member rear 20 compared to the body mount bracket rear 80 (which is the fastening portion to the rear portion of the rear suspension member 50). A bottom surface portion ridgeline L13 of the rear side member rear rearmost portion 26 has a linear slope shape which inclines downward toward the vehicle rear. In addition, the bottom surface portion ridgeline L13 indicates a boundary between the side plates 23A and 23B and the bottom plate 21 of the rear side member rear 20.

The bottom surface portion ridgeline L13 of the rear side member rear rearmost portion 26 at the rear portion of the body mount bracket rear 80 has the slope shape, so that the rear side member rear 20 is readily buckled and deformed (bent and deformed) in a vehicle forward diagonal upper direction during the rear end collision. As a result, it is possible to lift the body mount bracket rear 80 and the rear portion of the rear suspension member 50 toward an upper side in the vehicle height direction.

The front end of the rear side member rear 20 is coupled and fixed to the rear end of the rear side member front 10. Similar to the rear side member rear 20, the rear side member front 10 is also formed in a hat-shaped cross-sectional shape whose upper side is opened, and includes a bottom plate, a pair of upper plates, and a pair of side plates which connect the bottom plate and a pair of upper plates.

When the front end of the rear side member rear 20 and the rear end of the rear side member front 10 are coupled, the bottom plates, the side plate and the upper plates of both are overlaid, and are coupled by welding. In addition, FIGS. 2 to 4, 6 and 9 to 11 illustrate welding points as double circles (⊚).

In view of FIG. 2, step structures 24A and 24B which function as fragile portions may be formed on the upper plates 22A and 22B of the rear side member rear 20. In the view of FIG. 3, for example, the step structures 24A and 24B are formed at the vehicle front of a center axis S1 of the suspension member bolt 55.

The step structures 24A and 24B which are the fragile portions adopt structures such that ridgelines L11 which are boundaries between the upper plates 22A and 22B and the side plates 23A and 23B and extend in the vehicle length direction are bent in the vehicle height direction. Furthermore, similarly, the step structures 24A and 24B adopt structures such that ridgelines L12 which are vehicle width direction end rims of the upper plates 22A and 22B and extend in the vehicle length direction are also bent in the vehicle height direction.

Generally, when a load is inputted to a certain member, a transmission route of this load (load path) is formed on a region of high rigidity (which sustains the most against the load) in this member. When the rear side member rear 20 of the hat-shaped cross-sectional shape receives an input of the load in the vehicle length direction, a main load path is formed on a ridgeline extended in the vehicle length direction including the ridgelines L11 and L12. The step structures 24A and 24B bend the ridgelines L11 and L12 to which the main load is transmitted, so that a stress concentrates on an inflection point, and this inflection point is readily buckled compared to other regions.

As described below, during the rear end collision, the step structures 24A and 24B formed at an upper portion of the rear side member rear 20 are buckled prior to other portions. That is, the upper portion of the rear side member rear 20 is buckled and compressed prior to the lower portion. As a result, the rear side member rear 20 is warped downward like a bow, and, as a result, is recessed and bent so as to be bent downward with the step structures 24A and 24B as tops.

The bottom plate 21 of the rear side member rear 20 is provided with a rear fastening portion fastened to a rear portion of the rear suspension member 50. More specifically, the body mount bracket rear 80 is provided as the rear fastening portion to the bottom plate 21 with reference to FIG. 2 and FIG. 3 which is an A-A side surface cross-sectional view in FIG. 2. The tube nut 81 is provided inside the body mount bracket rear 80. The inside of the tube nut 81 is hollow, and the upper end portion of the suspension member bolt 55 is screwed in the hollow portion.

The body mount bracket rear 80 has a shape which protrudes toward a vehicle height direction lower side, and flanges 80A and 80B provided on a vehicle length direction front and rear, and the bottom plate 21 of the rear side member rear 20, are coupled and fixed by welding.

Furthermore, an opening 80D which penetrates in the vehicle height direction is formed on a bottom portion 80C of the body mount bracket rear 80. A flange 81A of the tube nut 81 is seated in the opening 80D. This seating point is welded, so that the tube nut 81 and the body mount bracket rear 80 are coupled.

An opening 29 into which the tube nut 81 is inserted is formed in the bottom plate 21 of the rear side member rear 20. Furthermore, at an upper end of the tube nut 81, i.e., on a side facing the flange 81A, a small diameter portion 81B is formed. This small diameter portion 81B is inserted into a bearing hole 105 of the nut bearing bracket 100. The upper end of the tube nut 81 is supported by the nut bearing bracket 100, so that it is possible to prevent movement (wobbling) about the center axis S1 of the tube nut 81.

The nut bearing bracket 100 is a support member which prevents staggering of the tube nut 81 as described above. In view of FIG. 3, the nut bearing bracket 100 includes a bottom portion 101, an upper portion 102, an inclining portion 103 which connects the bottom portion 101 and the upper portion 102, and a pair of side portions 104.

The bottom portion 101 of the nut bearing bracket 100 is coupled and fixed to the bottom plate 21 of the rear side member rear 20 by welding. The bearing hole 105 into which the small diameter portion 81B of the tube nut 81 is inserted is formed at the center of the upper portion 102 of the nut bearing bracket 100 in the vehicle width direction.

Furthermore, in view of FIG. 2, upper flanges 102A and 102B which are coupled and fixed to a pair of upper plates 22A and 22B of the rear side member rear 20 by welding are formed at vehicle width direction both ends of the upper portion 102. The step structures 24A and 24B which are the fragile portions are formed at the front of fixing portions of the upper plates 22A and 22B and the upper flanges 102A and 102B.

The nut bearing bracket 100 and, in addition, the side member reinforcement 110 are provided inside the rear side member rear 20. The side member reinforcement 110 is a reinforcing member which is provided at the rear of the nut bearing bracket 100, prevents the crush and the deformation in the vehicle length direction of the rear side member rear 20 at the initial stage of the rear end collision, and resists the load in the vehicle length direction.

The side member reinforcement 110 is attached to the rear side member rear rearmost portion 26 at a rear of the rear side member rear 20 with respect to the body mount bracket rear 80. In this regard, as illustrated in FIGS. 2 and 3, the front end of the side member reinforcement 110, and a rear end of the body mount bracket rear 80 (which is the fastening portion to the rear portion of the rear suspension member 50) may be apart in the vehicle length direction. According to this arrangement, a portion between the rear end of the body mount bracket rear 80 and the front end of the side member reinforcement 110 in the bottom plate 21 of the rear side member rear 20 is a non-reinforced portion 27, and can become a deformation start point during the rear end collision.

Figure 4:
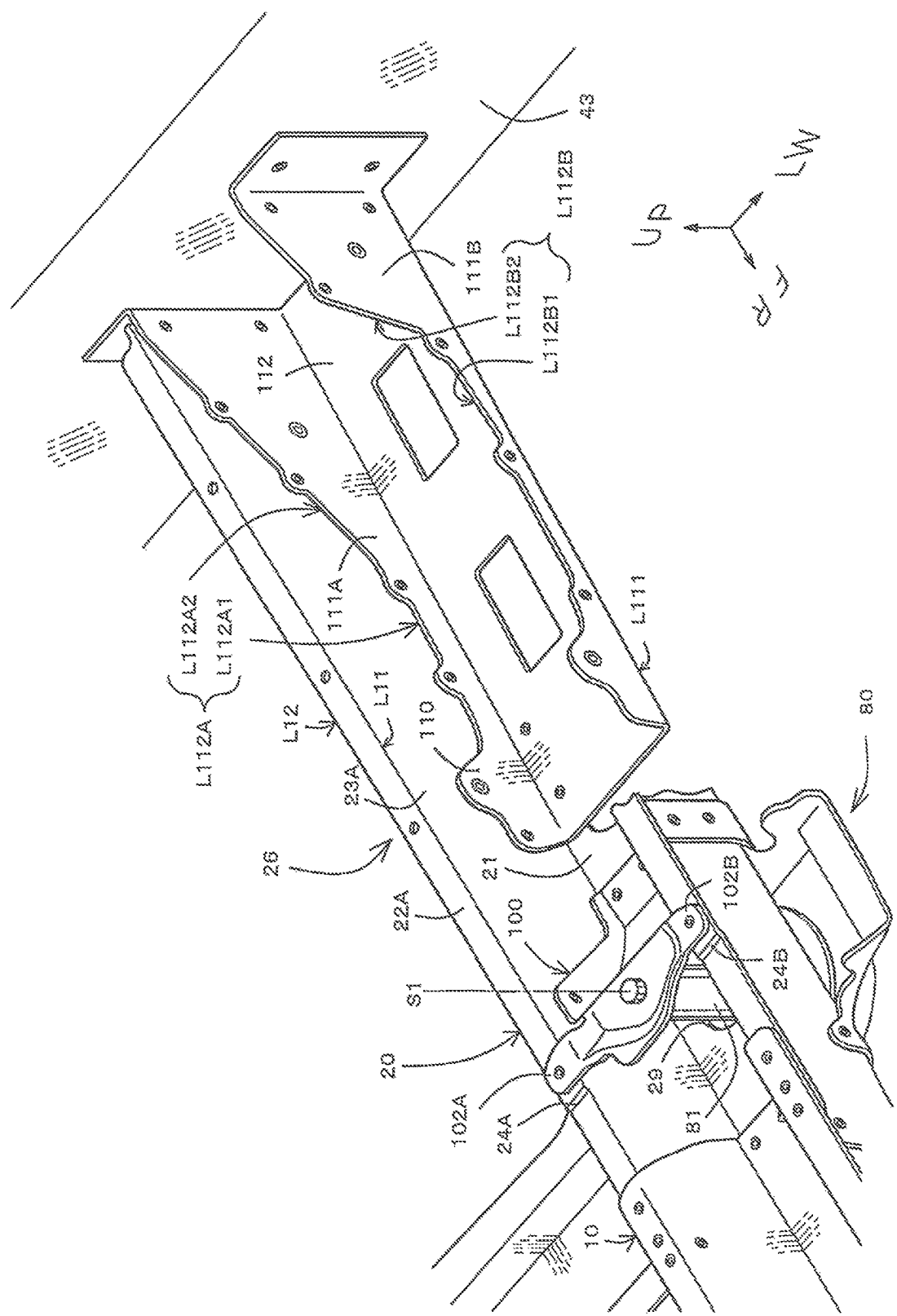
FIG. 4 is a perspective view which omits illustration of part of the rear side member rear in FIG. 2.
Figure 5:
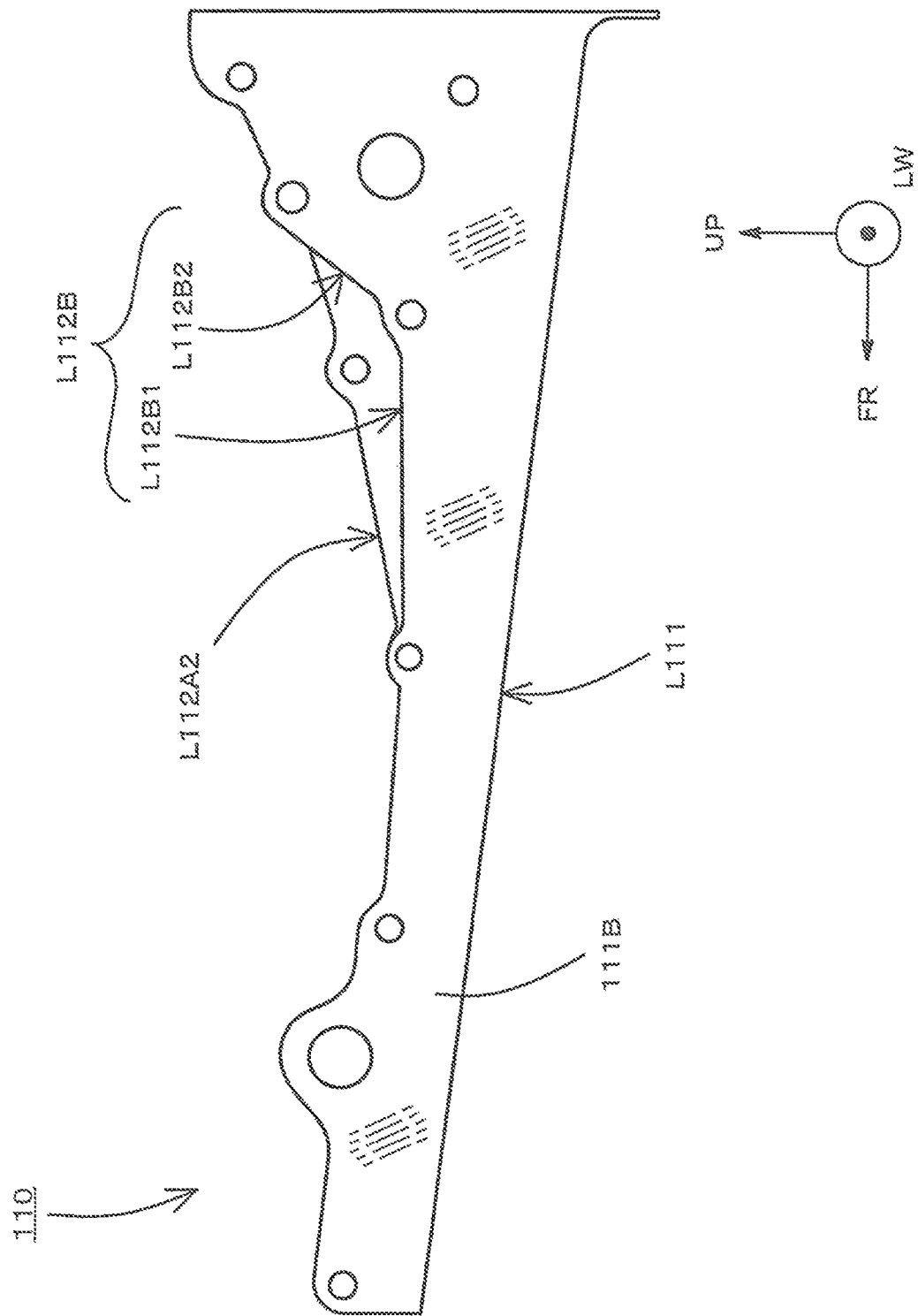
FIG. 5 is a side view illustrating a side member reinforcement.

The side member reinforcement 110 is extended in the vehicle length direction along the rear side member rear rearmost portion 26. FIG. 4 illustrates a perspective view from which part of the bottom plate 21, the upper plate 22B and the side plate 23B of the rear side member rear 20 are removed from the perspective view in FIG. 2, and FIG. 5 illustrates a side view of the side member reinforcement 110.

The side member reinforcement 110 has a square cup shape in a front view (in an FR axis view), and includes a pair of side plates 111A and 111B which face in the vehicle width direction, and a bottom plate 112 which connects lower ends of a pair of side plates 111A and 111B.

The bottom plate 112 of the side member reinforcement 110 is welded to the bottom plate 21 of the rear side member rear rearmost portion 26 by welding. For example, the bottom plate 112 of the side member reinforcement 110 is extended parallel to the bottom plate 21 of the rear side member rear rearmost portion 26.

Similarly, the side plates 111A and 111B of the side member reinforcement 110 are bonded to the side plates 23A and 23B (see FIG. 2) of the rear side member rear rearmost portion 26 by welding. For example, the side plates 111A and 111B of the side member reinforcement 110 are extended parallel to the side plates 23A and 23B of the rear side member rear rearmost portion 26.

A boundary between the side plates 111A and 111B and the bottom plate 112 of the side member reinforcement 110 is provided as a bottom surface portion ridgeline L111. The bottom surface portion ridgeline L111 which forms a lower portion of the side member reinforcement 110 is provided parallel to the bottom surface portion ridgeline L13 (see FIG. 2) of the rear side member rear rearmost portion 26. The two ridgelines are overlaid, so that the load bearing property in the vehicle length direction improves.

Furthermore, upper ridgelines L112A and L112B are provided as upper end rims of side plates 111A and 111B. Part of the upper ridgelines L112A and L112B which form an upper portion of the side member reinforcement 110 are formed non-parallel to the ridgeline L11 above the rear side member rear 20.

More specifically, the upper ridgeline L112A of the side plate 111A includes a first ridgeline L112A1 and a second ridgeline L112A2. The first ridgeline L112A1 is provided at a vehicle direction front, and extends relatively in the vehicle length direction compared to the second ridgeline L112A2. The second ridgeline L112A2 is connected to a rear end of the first ridgeline L112A1, and extends relatively in the vehicle height direction compared to the first ridgeline L112A1.

Similarly, the upper ridgeline L112B of the side plate 111B includes a first ridgeline L112B1 and a second ridgeline L112B2. The first ridgeline L112B1 is provided at the vehicle direction front, and is extended relatively in the vehicle length direction compared to the second ridgeline L112B2. The second ridgeline L112B2 is connected to a rear end of the first ridgeline L112B1, and is extended relatively in the vehicle height direction compared to the first ridgeline L112B1.

Thus, the upper ridgelines L112A and L112B of the side plates 111A and 111B have shapes which are bent in the vehicle length direction, and therefore have the load bearing property with respect to an input of the load in the vehicle length direction compared to the bottom surface portion ridgeline L111 linearly extended along the vehicle length direction. In other words, a difference in a shape of a ridgeline of the upper portion and the lower portion (the upper ridgelines L112A and L112B and the bottom surface portion ridgeline L111) of the side member reinforcement 110 forms the fragile portions of low rigidity at the upper portion compared to the lower portion. That is, the upper ridgelines L112A and L112B function as the fragile portions.

As described below, the rear side member rear rearmost portion 26 is reinforced against a load in the vehicle length direction by the side member reinforcement 110 which is the reinforcing member. Consequently, at the initial stage of the rear end collision, the rear side member rear rearmost portion 26 is prevented from being crushed and deformed in the vehicle length direction, and the non-reinforced portion 27 (see FIG. 3) at the front of the rear side member rear rearmost portion 26 starts being buckled. The rear side member rear rearmost portion 26 is prevented from being buckled at the initial stage of the rear end collision, so that a lifting height of the rear portion of the rear suspension member 50 is secured. In addition, the side member reinforcement 110 includes relatively fragile portions (upper ridgelines L112A and L112B) at the upper portion. Consequently, when the rear end collision advances, and the non-reinforced portions are buckled, the fragile portions can be buckled, and collision energy is absorbed by the buckling.

Furthermore, as illustrated in FIGS. 4 and 5 in particular, the first ridgeline L112B1 of the side plate 111B is extended to the vehicle rear side of the first ridgeline L112A1 of the side plate 111A. Furthermore, the second ridgeline L112B2 of the side plate 111B is a steeper gradient than the second ridgeline L112A2 of the side plate 111A. Thus, the first ridgeline L112B1 and the second ridgeline L112B2 form a substantially L-shaped (reverse L-shaped in FIG. 5) ridgeline. This shape is formed so that, as will be described later, the side member reinforcement 110 and the rear side member rear rearmost portion 26 are readily buckled and deformed (crushed and deformed) at a later stage of the rear end collision.

In addition, in the examples in FIGS. 4 and 5, the shapes of the side plates 111A and 111B and, more particularly, the shapes of the first ridgelines L112A1 and L112B1 and the second ridgelines L112A2 and L112B2 are made different, yet are not limited to this form. For example, the shape of the side plate 111A may be the same shape as that of the side plate 111B.

Figure 6:
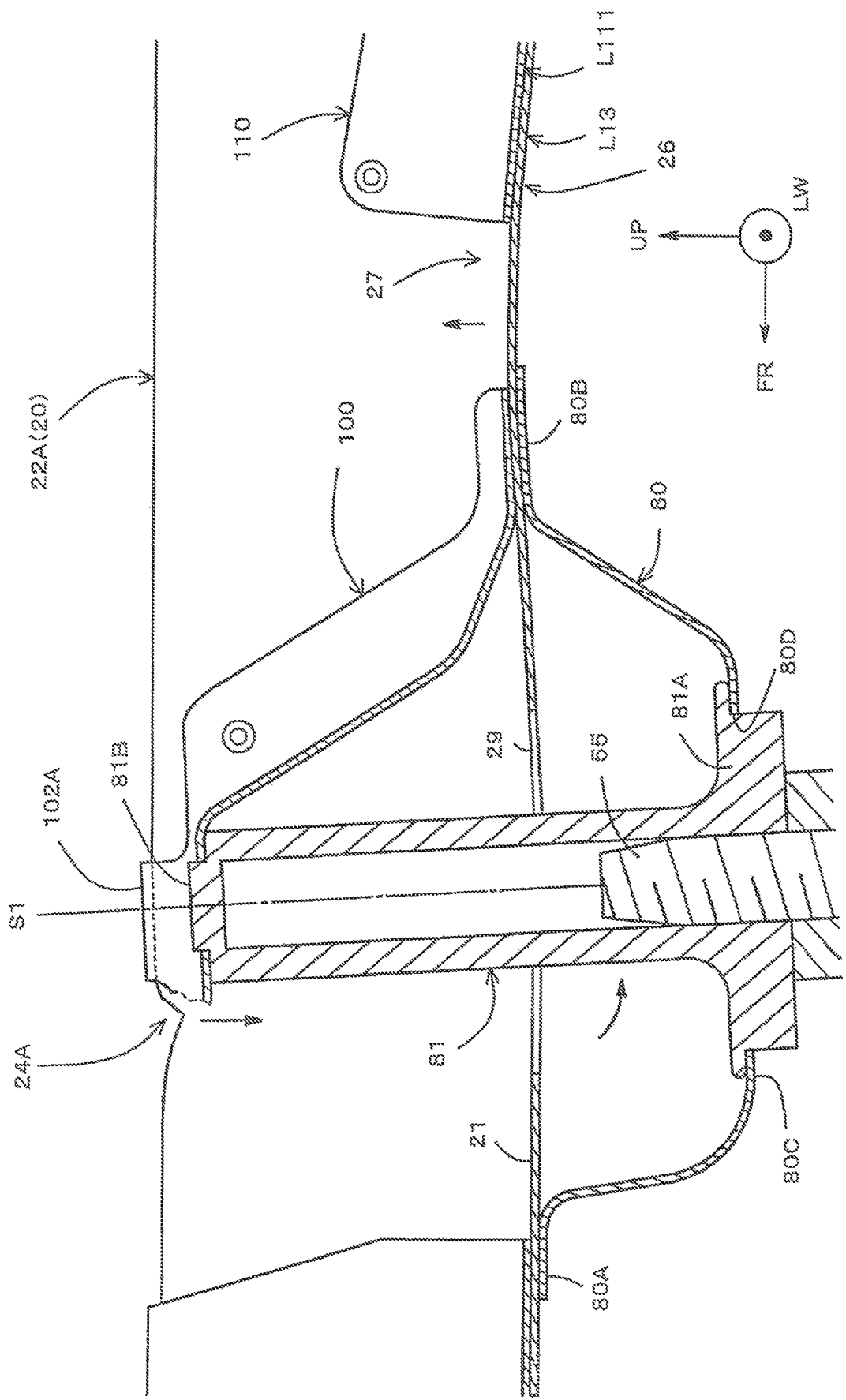
FIG. 6 is a view (1/3) for explaining a behavior during rear end collision of the vehicle rear portion structure according to the present embodiment.

A behavior during rear end collision of the vehicle rear portion structure according to the present embodiment will be described with reference to FIGS. 6 to 8. FIG. 6 illustrates an example of the initial stage of the rear end collision. The collision load is inputted from the vehicle rear to the bumper reinforcement 40. This collision load is transmitted to the rear side member rear 20. When the collision load is inputted in the vehicle length direction from the rear of the rear side member rear 20 as a result of this transmission, a reaction force is produced against the collision load from the front of the rear side member rear 20, and the rear side member rear 20 receives a compression load.

As illustrated in FIG. 6, as the compression load is inputted, the step structure 24A is buckled and compressed. When the upper side of the rear side member rear 20 is crushed, the lower side of the rear side member rear 20 warps like a bow and, as a result, the rear side member rear 20 is buckled (recessed and bent) downward with the step structure 24A as a top.

When the front side of the center axis of the suspension member bolt 55 is recessed and bent, the tube nut 81 and the suspension member bolt 55 screwed in the tube nut 81 are turned counterclockwise in the side view, i.e., the upper side is turned forward and the lower side is turned rearward.

As the tube nut 81 and the suspension member bolt 55 turn bending forward, the suspension member bolt 54 on the front of the rear suspension member 50 (see FIG. 1) is also turned bending forward similar to the suspension member bolt 55. As a result, the rear suspension member 50 takes such a forward bending posture that the front of the rear suspension member 50 is pushed downward.

In addition, the slope shape of the bottom surface portion ridgeline L13 of the rear side member rear rearmost portion 26 buckles (bends and deforms) the rear side member rear rearmost portion 26 in the vehicle forward diagonal upper direction. In this case, as illustrated in FIG. 6, a bottom surface portion ridgeline LI II of the side member reinforcement 110 is extended so as to overlap the bottom surface portion ridgeline L13 of the rear side member rear rearmost portion 26. Consequently, the rear side member rear rearmost portion 26 and the side member reinforcement 110 are prevented from being crushed and deformed in the vehicle length direction in response to the collision load (compression load).

Figure 7:
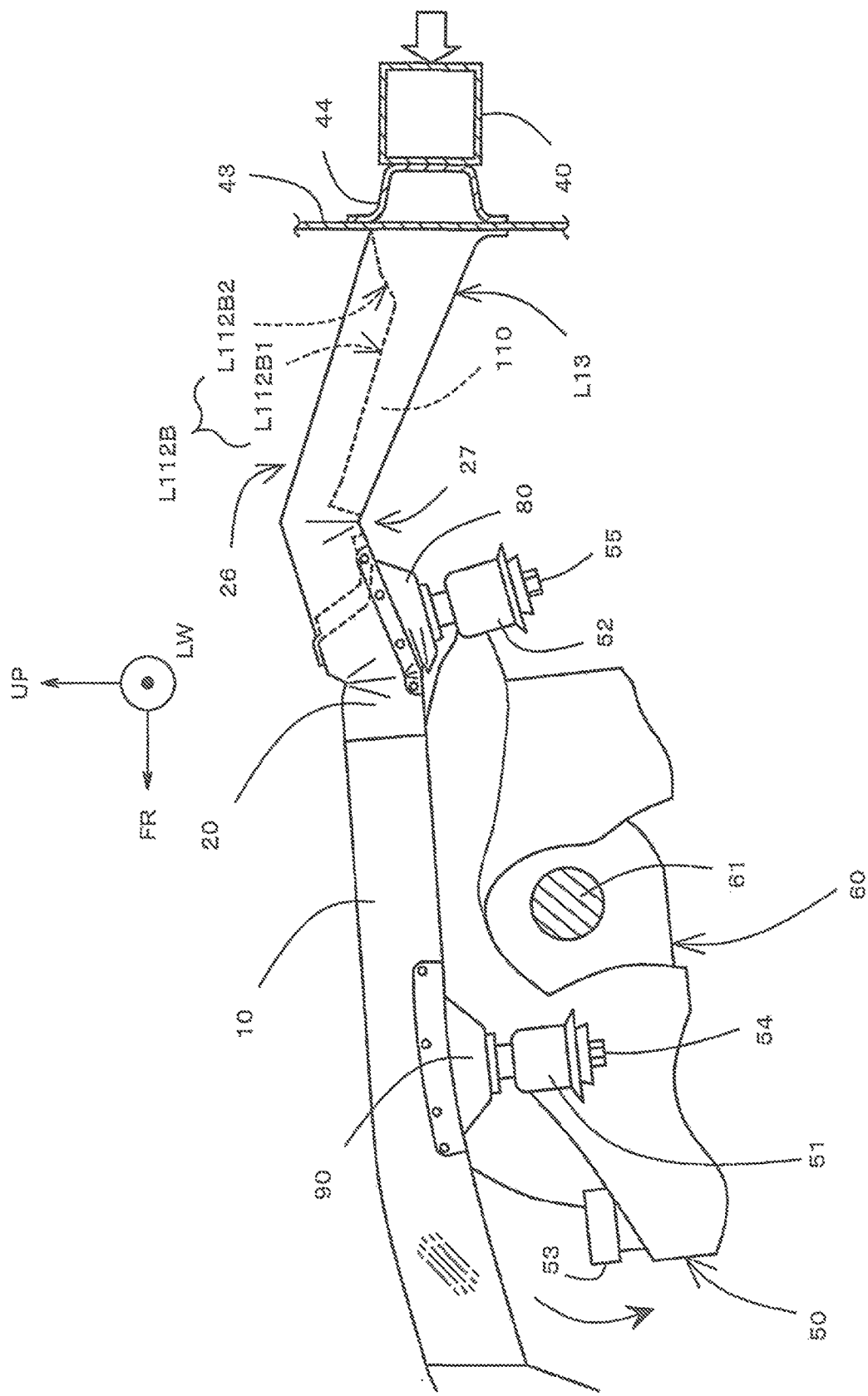
FIG. 7 is a view (2/3) for explaining the behavior during the rear end collision of the vehicle rear portion structure according to the present embodiment.
Figure 8:
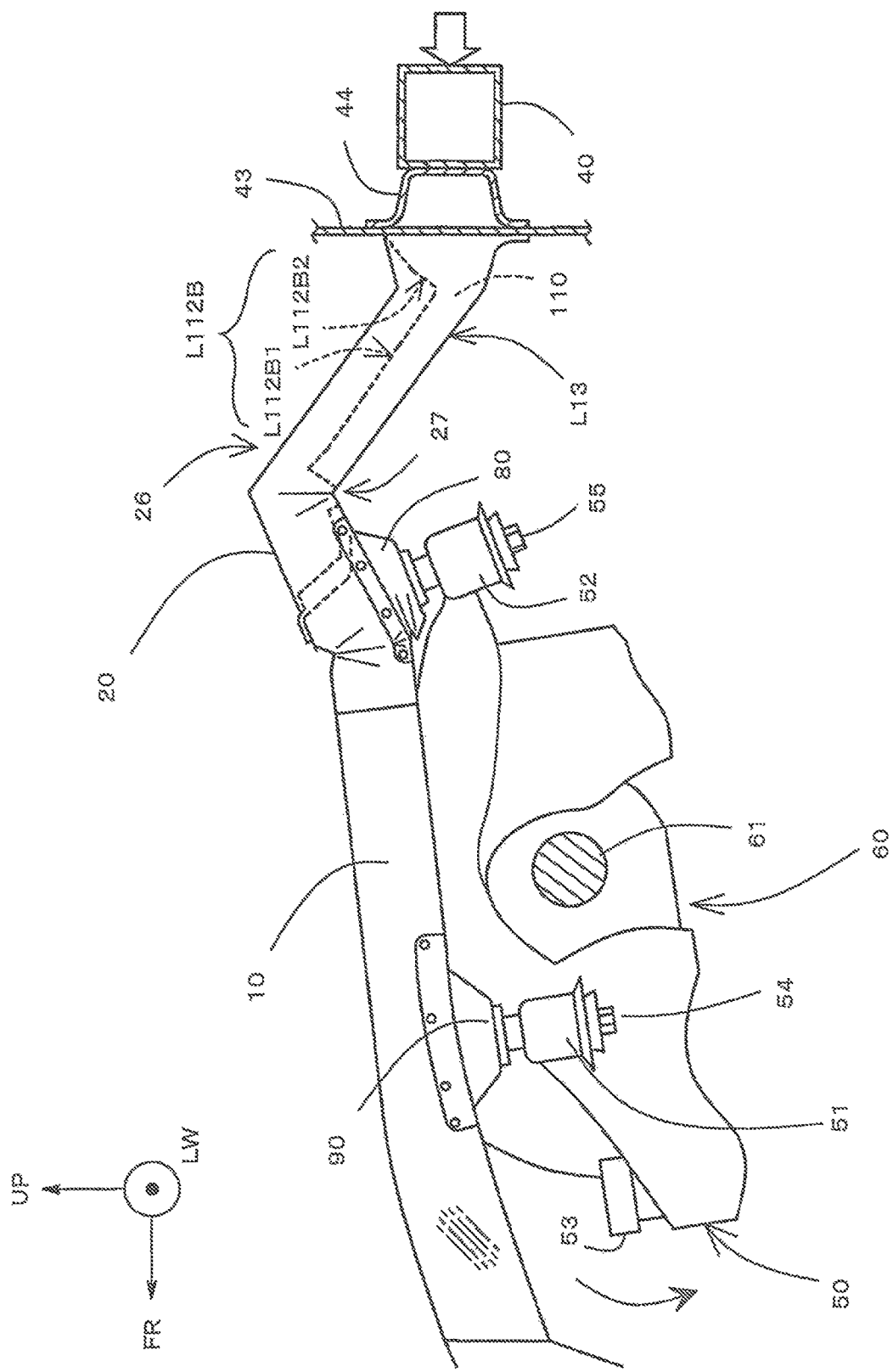
FIG. 8 is a view (3/3) for explaining the behavior during the rear end collision of the vehicle rear portion structure according to the present embodiment.

When the rear side member rear rearmost portion 26 is buckled (bent and deformed) in the vehicle diagonal upper direction, as illustrated in FIG. 6, the non-reinforced portion 27 at the front of the front end portion of the side member reinforcement 110 is lifted and is buckled and deformed, so that a protruding bend illustrated in FIG. 7 occurs. That is, the non-reinforced portion 27 at the rear of the body mount bracket rear 80 is a top of the protruding bend.

Buckling of the rear side member rear rearmost portion 26 in the vehicle diagonal upper direction progresses, so that the rear portion of the rear suspension member 50 is lifted. Consequently, as illustrated in FIG. 7, the rear suspension member 50 is turned about the front arms 51 and in the counterclockwise direction in the side view in FIG. 7. As a result, the rear suspension member 50 takes such a forward bending posture that the front end portion (motor support 53) of the rear suspension member 50 is pulled down.

When the rear end collision further progresses, the front of the rear side member rear rearmost portion 26 is further raised upward. In this case, the first ridgeline L112B1 and the second ridgeline L112B2 which are ridgelines of an upper portion of the side member reinforcement 110 disposed in the rear side member rear rearmost portion 26 are displaced from an approximately L shape in the side view to a V shape.

That is, the first ridgeline L112B1 which has the approximately L shape at the initial stage of the rear end collision and is extended in the vehicle length direction in particular sustains against the collision load and is prevented from being crushed and deformed. However, the first ridgeline L112B1 is displaced in the V shape, so that the load bearing property against the collision load relatively lowers, and the first ridgeline L112B1 is readily buckled and deformed. More specifically, as illustrated in FIG. 8, the first ridgeline L112B1 is crushed and deformed such that a valley width of the V shape formed by the first ridgeline L112B1 and the second ridgeline L112B2 narrows.

Thus, according to the vehicle rear portion structure according to the present embodiment, the rear side member rear rearmost portion 26 at the initial stage of the rear end collision is prevented from being crushed and deformed by the side member reinforcement 110. Consequently, the lifting height of the rear portion of the rear suspension member 50 is secured.

When the rear end collision further progresses, and the non-reinforced portion 27 is buckled to some degree, as the rear side member rear rearmost portion 26 is displaced, the ridgelines (the first ridgeline L112B1 and the second ridgeline L112B2) of the upper portion of the side member reinforcement 110 are disposed (at an angle) such that the ridgelines are readily buckled by the collision load. Consequently, the rear side member rear rearmost portion 26 is crushed and deformed, and collision energy is absorbed.

Other Examples of Present Embodiment

Figure 9:
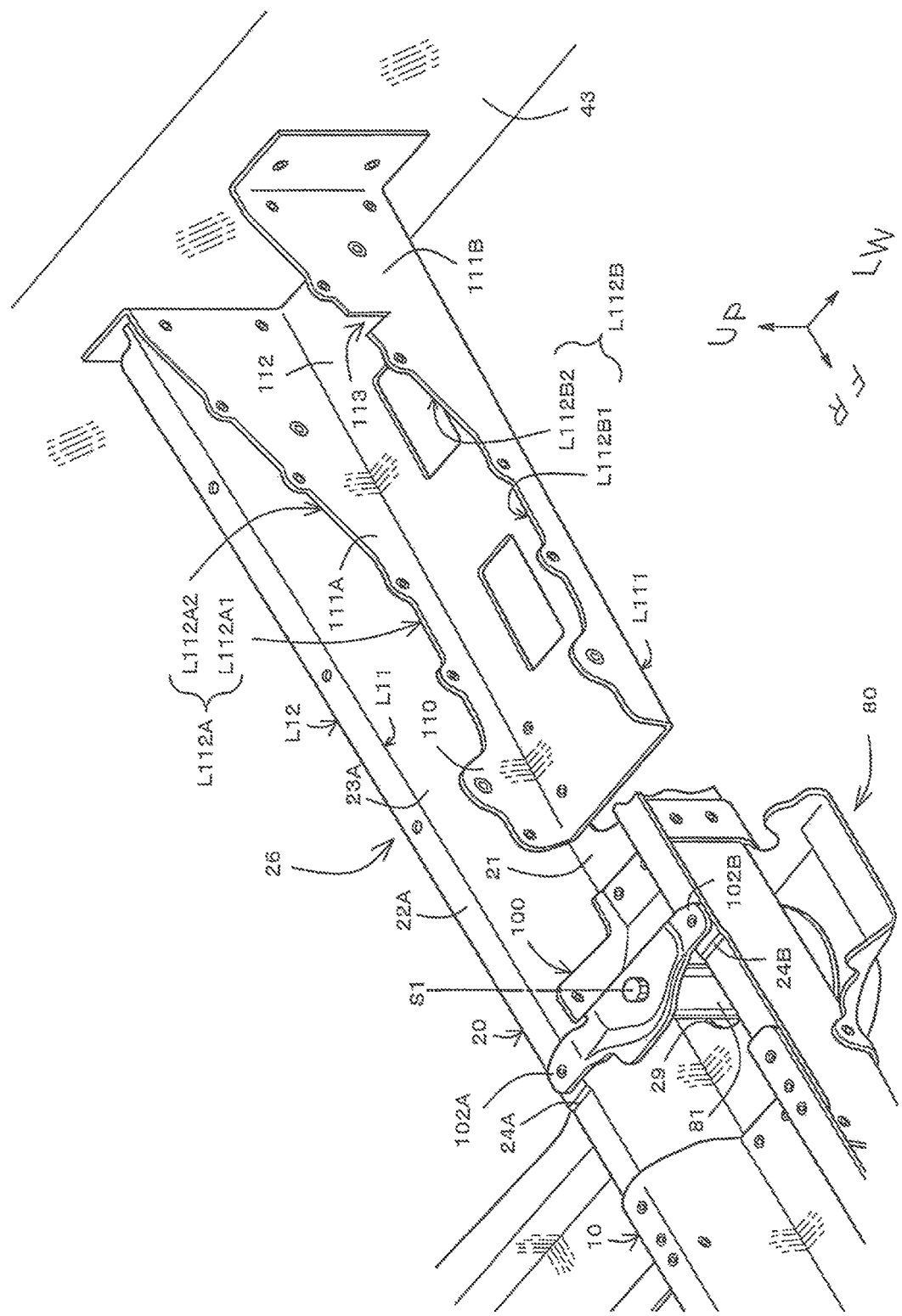
FIG. 9 is a perspective view illustrating a first other example of the vehicle rear portion structure according to the present embodiment.

FIG. 9 illustrates a first other example of the vehicle rear portion structure according to the present embodiment. Differences from the embodiment in FIG. 4 include that the shape of the side plate 111B of the side member reinforcement 110 has the same shape as that of the side plate 111A, and a cutout 113 is formed at an upper portion of the side plate 111B and is a fragile portion. The cutout 113 is formed so as to reach from, for example, an upper end of the side plate 111B to a depth which is less than half of a height direction length.

The cutout 113 is terminated above the bottom surface portion ridgeline L111 of the side member reinforcement 110, and rigidity of the bottom surface portion ridgeline L111 is maintained. Furthermore, during the rear end collision, the rear side member rear rearmost portion 26 is buckled (bent and deformed) in the vehicle forward diagonal upper direction, and then the rear side member rear rearmost portion 26 and the side member reinforcement 110 are buckled and deformed such that the cutout 113 is crushed in the vehicle direction. Thus, the collision energy is absorbed.

Figure 10:
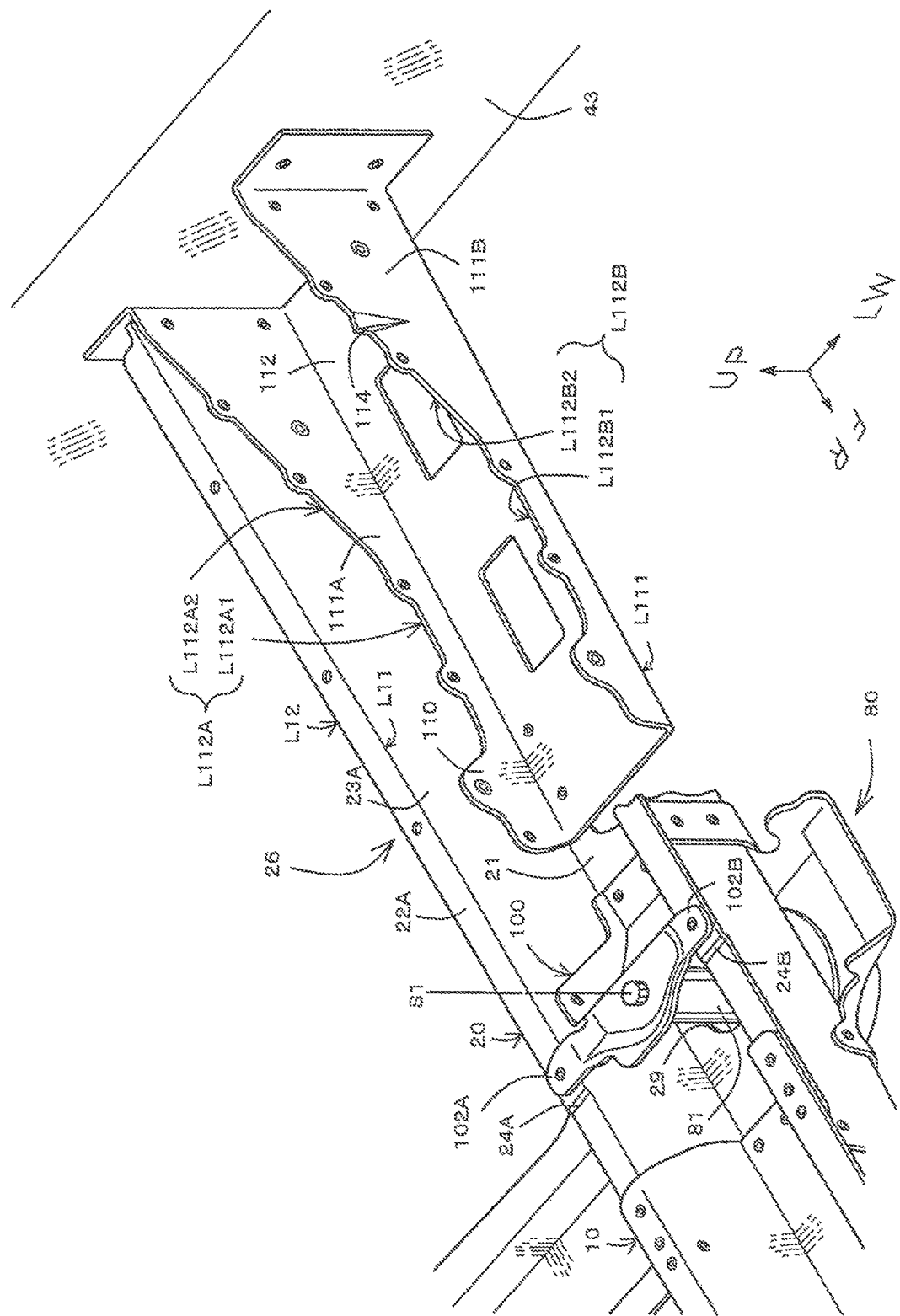
FIG. 10 is a perspective view illustrating a second other example of the vehicle rear portion structure according to the present embodiment.
Figure 11:
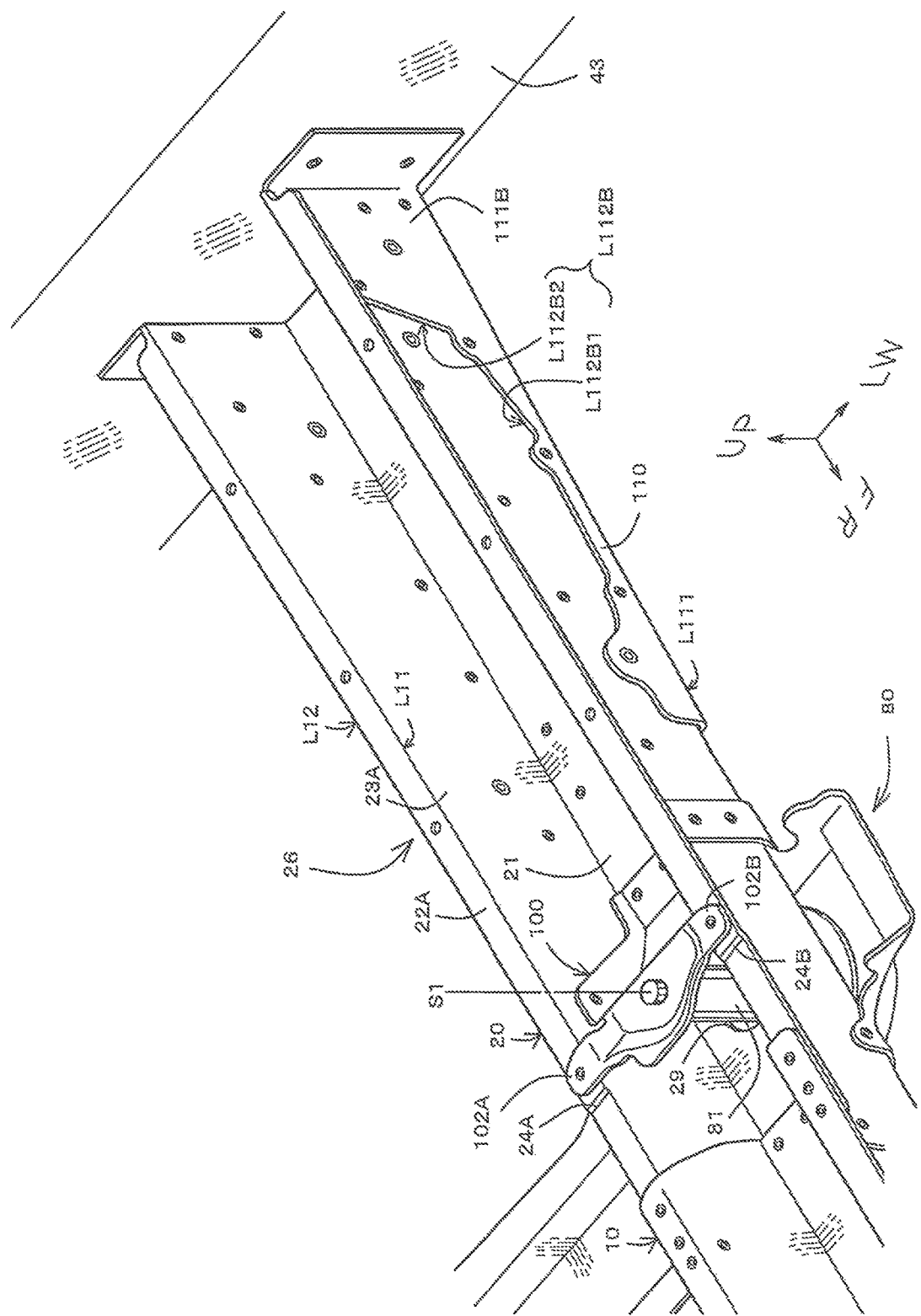
FIG. 11 is a perspective view illustrating a third other example of the vehicle rear portion structure according to the present embodiment.
Figure 12:
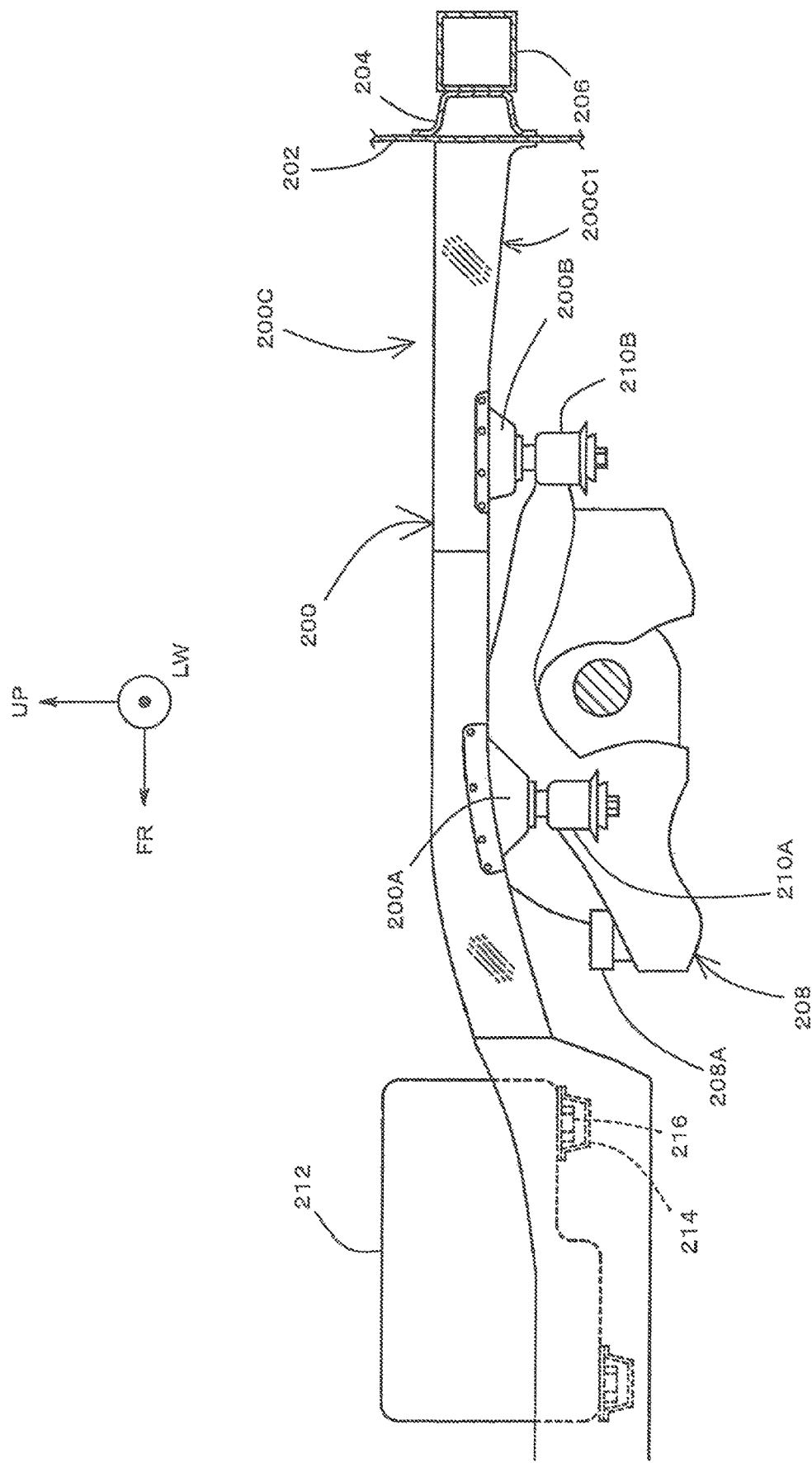
FIG. 12 is a side view illustrating a vehicle rear portion structure according to a conventional technique.
Figure 13:
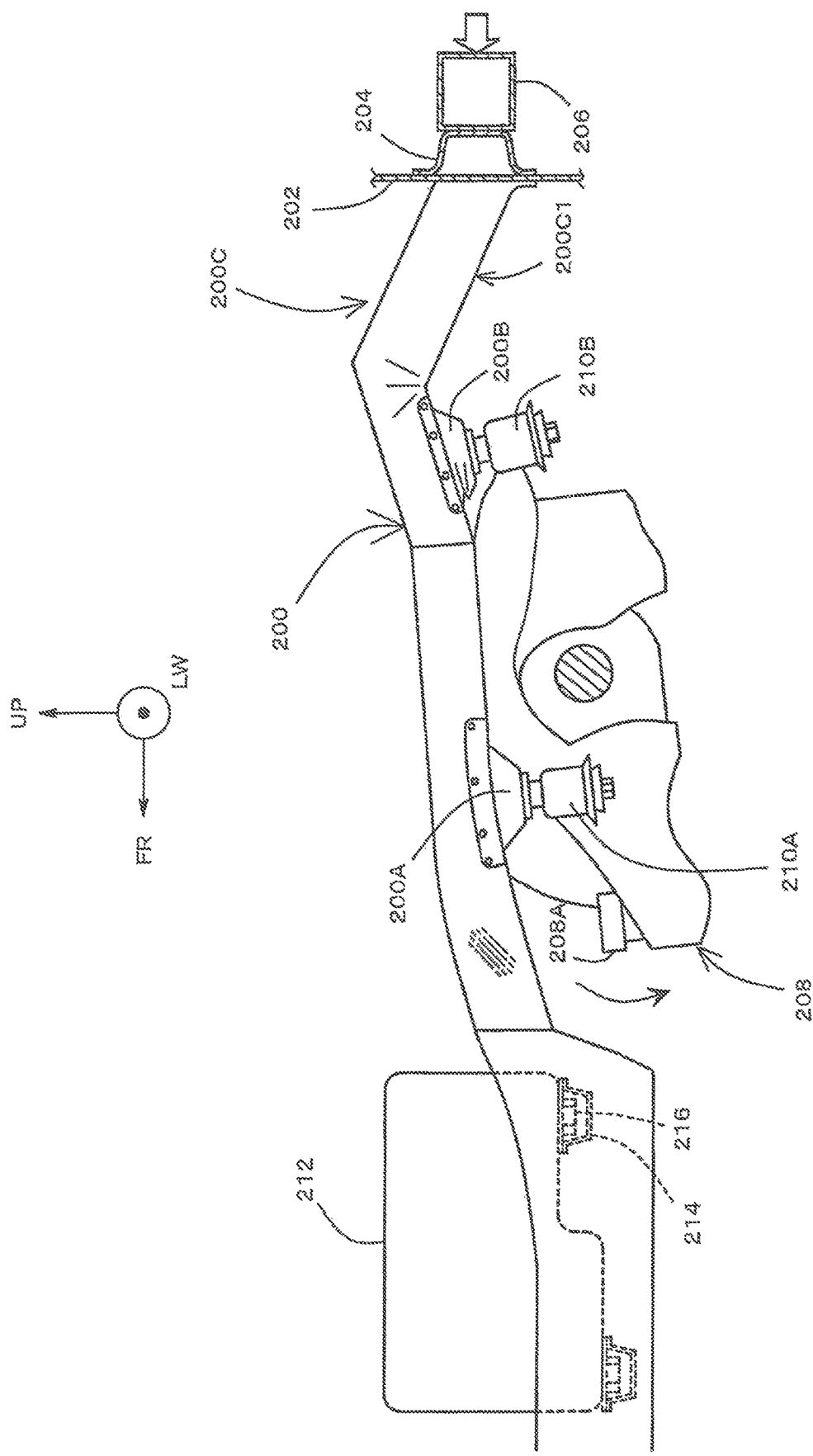
FIG. 13 is a side view illustrating a state (a protruding bend) during the rear end collision of the vehicle rear portion structure according to the conventional technique.
Figure 14:
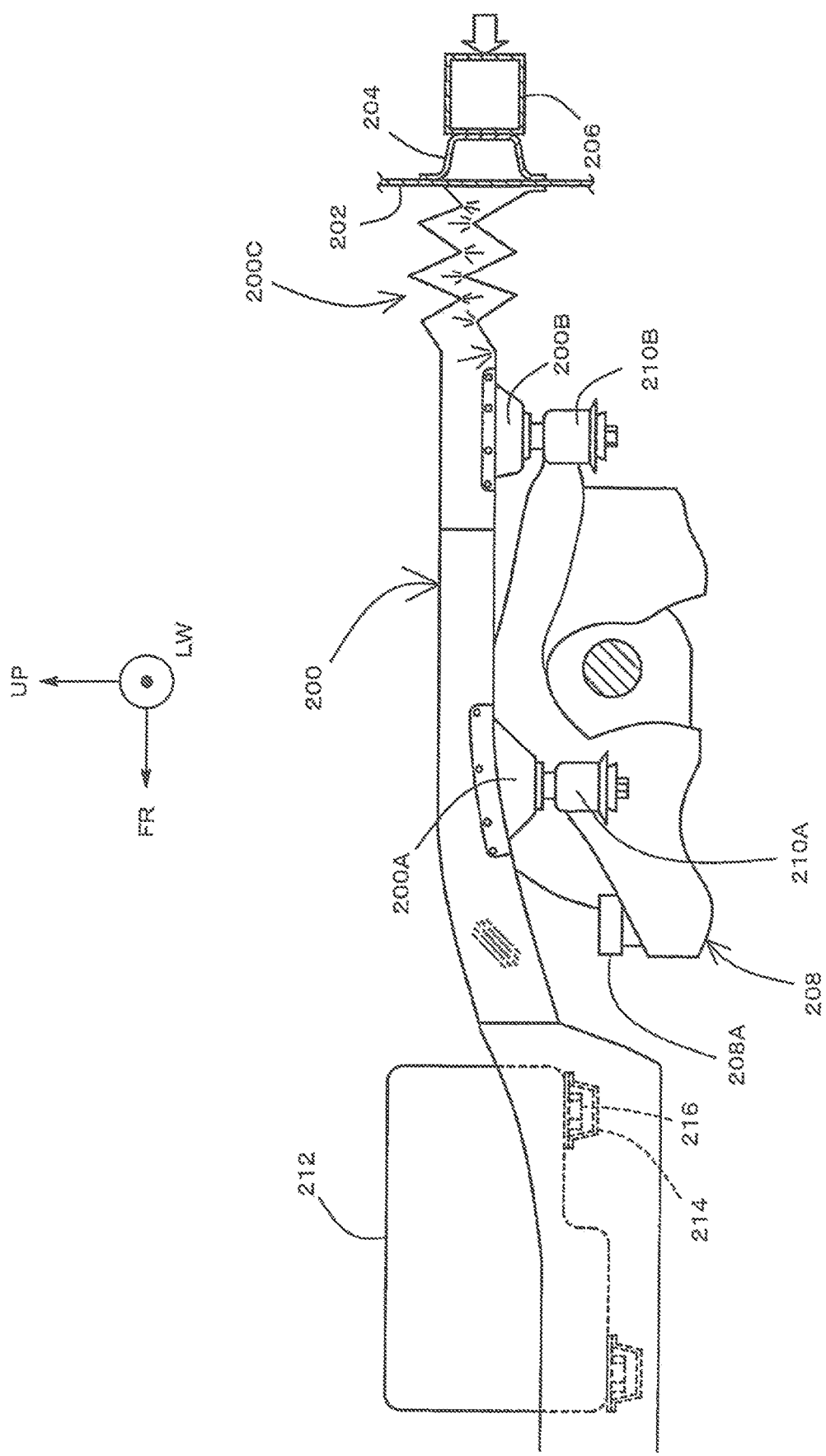
FIG. 14 is a side view illustrating a state (a crush and deformation) during the rear end collision of the vehicle rear portion structure according to the conventional technique.
Figure 15:
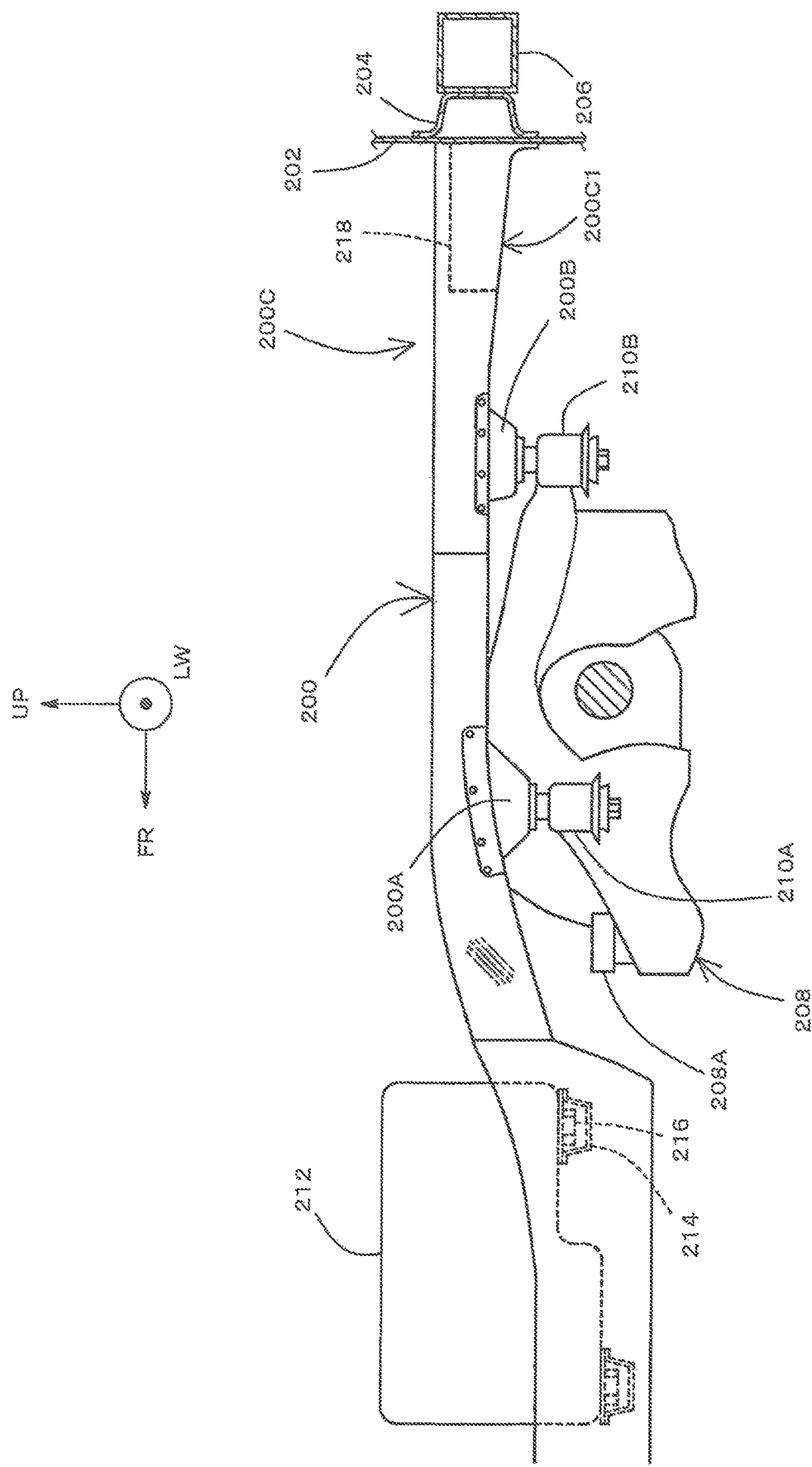
FIG. 15 is a side view illustrating the vehicle rear portion structure according to the conventional technique.

Furthermore, FIG. 10 illustrates a second other example of the vehicle rear portion structure according to the present embodiment. A difference from the embodiment in FIG. 9 is that a bent-back structure 114 is formed as the fragile portion instead of the cutout 113. The bent-back structure 114 is formed by bending the second ridgeline L112B2 of the side plate 111B in the vehicle width direction. The bent-back structure 114 is formed so as to reach from, for example, the upper end of the side plate 111B to a depth which is less than half of the height direction length.

The bent-back structure 114 is terminated above the bottom surface portion ridgeline LIII of the side member reinforcement 110, and the rigidity of the bottom surface portion ridgeline L111 is maintained. Furthermore, during the rear end collision, the rear side member rear rearmost portion 26 is buckled (bent and deformed) in the vehicle forward diagonal upper direction, and then the rear side member rear rearmost portion 26 and the side member reinforcement 110 are buckled and deformed such that the bent-back structure 114 is crushed in the vehicle direction. Thus, the collision energy is absorbed.

Furthermore, in the example in FIG. 4, the side member reinforcement 110 is disposed inside the rear side member rear rearmost portion 26. However, as illustrated in, for example, FIG. 11, the side member reinforcement 110 may be disposed outside the rear side member rear rearmost portion 26. Even this configuration can provide the same function and effect as those of FIG. 4 in terms of the structure.

In addition, the present disclosure is not limited to the above-described embodiment, and includes all changes and modifications that do not depart from the technical range and the essence of the present disclosure defined by the claims.

The invention claimed is:

1. A vehicle rear portion structure comprising:
   rear side members which are provided on both sides in a vehicle width direction at a vehicle rear, and extend in a vehicle length direction; and
   a rear suspension member which is hung and supported by the rear side members, wherein
   a ridgeline of a bottom surface portion at a rear portion of the rear side members at a rear of a fastening portion of the rear side members to the rear portion of the rear suspension member is a slope shape which inclines downward toward the vehicle rear,
   a reinforcing member which is against a load in the vehicle length direction is attached to the rear portion of the rear side members, and
   a fragile portion which is formed at an upper portion of the reinforcing member and has a low rigidity compared to a lower portion of the reinforcing member.

2. The vehicle rear portion structure according to claim 1, wherein
   the lower portion of the reinforcing member includes a ridgeline along the ridgeline of the bottom surface portion at the rear portion of the rear side members, and
   the upper portion of the reinforcing member includes a ridgeline of an approximately L shape as the fragile portion which includes a first ridgeline which is extended relatively in the vehicle length direction in a side view, and a second ridgeline which is extended relatively in a vehicle height direction.

3. The vehicle rear portion structure according to claim 2, wherein
   the fastening portion of the rear side members to the rear portion of the rear suspension members, and a front end of the reinforcing member, are apart from each other.

4. The vehicle rear portion structure according to claim 1, wherein
   the fastening portion of the rear side members to the rear portion of the rear suspension members, and a front end of the reinforcing member, are apart from each other.

* * * * *